(12) United States Patent
Confield et al.

(10) Patent No.: US 7,658,113 B2
(45) Date of Patent: Feb. 9, 2010

(54) LIFT MEASUREMENT

(75) Inventors: Ivan Fyfe Confield, Aberdour (GB);
Derek Gray MacKay, Edinburgh (GB);
Robert George Andrew Melville, Derby (GB); David Harvey, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 12/068,222

(22) Filed: Feb. 4, 2008

(65) Prior Publication Data

US 2008/0196508 A1 Aug. 21, 2008

(30) Foreign Application Priority Data

Feb. 16, 2007 (GB) ................... 0703006.7
Feb. 16, 2007 (GB) ................... 0703126.3

(51) Int. Cl.
*G01L 1/24* (2006.01)
*G01B 5/30* (2006.01)
(52) U.S. Cl. .......................... 73/800; 73/760
(58) Field of Classification Search .............. 73/800
See application file for complete search history.

(56) References Cited

U.S. PATENT DOCUMENTS

| 2,979,010 | A | | 4/1961 | Braddon et al. | |
|---|---|---|---|---|---|
| 3,020,869 | A | | 2/1962 | Beach | |
| 3,224,265 | A | | 12/1965 | Mazelsky et al. | |
| 3,464,651 | A | | 9/1969 | Lightfoot | |
| 3,696,673 | A | * | 10/1972 | Ribner et al. | 73/861.74 |
| 3,744,928 | A | | 7/1973 | Hansen et al. | |
| 3,780,817 | A | | 12/1973 | Videon | |
| 5,992,341 | A | * | 11/1999 | Gerhardt | 114/102.16 |
| 6,122,978 | A | * | 9/2000 | Callendrier | 73/862.474 |
| 6,609,471 | B1 | * | 8/2003 | Carrel et al. | 114/39.11 |
| 7,395,727 | B2 | * | 7/2008 | Moore | 73/866.5 |
| 2003/0040894 | A1 | * | 2/2003 | Miyori et al. | 703/6 |
| 2007/0008286 | A1 | * | 1/2007 | Theytaz et al. | 345/166 |
| 2008/0201030 | A1 | * | 8/2008 | Melville | 701/21 |

FOREIGN PATENT DOCUMENTS

| EP | 0 272 058 A2 | 6/1988 |
|---|---|---|
| EP | 0 738 882 A2 | 10/1996 |
| EP | 1 249 692 A1 | 10/2002 |
| GB | 666540 | 2/1952 |
| GB | 673534 | 6/1952 |
| GB | 829821 | 3/1960 |
| GB | 1 348 585 | 3/1974 |
| GB | 1 512 556 | 6/1978 |
| GB | 2 057 677 A | 4/1981 |
| JP | A-2002-54922 | 2/2002 |
| JP | A-2003-222507 | 8/2003 |
| JP | A-2003-287435 | 10/2003 |
| JP | A-2005-127744 | 5/2005 |
| WO | WO 02/052223 A1 | 7/2002 |
| WO | WO 2006/032486 A1 | 3/2006 |

\* cited by examiner

*Primary Examiner*—Max Noori
(74) *Attorney, Agent, or Firm*—Oliff & Berridge, PLC (57) ABSTRACT

A method of determining the lift generated by a lift-generating member is presented. The lift-generating member being coupled to a component within the lift load path with the lift load path component experiencing strain as a result of the lift generated by the lift-generating member. The method involves the steps of coupling at least one strain measurement means to the lift load path component, obtaining strain measurements from the strain measurement means, and calculating the lift generated by the lift-generating member from strain measurements.

19 Claims, 4 Drawing Sheets

LIFT MEASUREMENT

The present invention relates to measuring the lift generated by a lift-generating member. It finds particular application where the lift-generating member is subject to additional torsional and/or noise forces, such as stabilising fins for a ship, aerofoils for an aircraft or rotor blade arrangements for a helicopter.

Stabilising fins are mounted below the waterline on the hull of a ship to improve the stability of the ship, particularly in rough seas. A fin is connected into the ship via a shaft and is rotatable about its longitudinal axis to vary the angle of the fin. Usually a ship has a fin on each of the opposed sides of its hull, which are independently controlled and generally act in opposition to reduce adverse roll and pitch effects.

Figure 1:
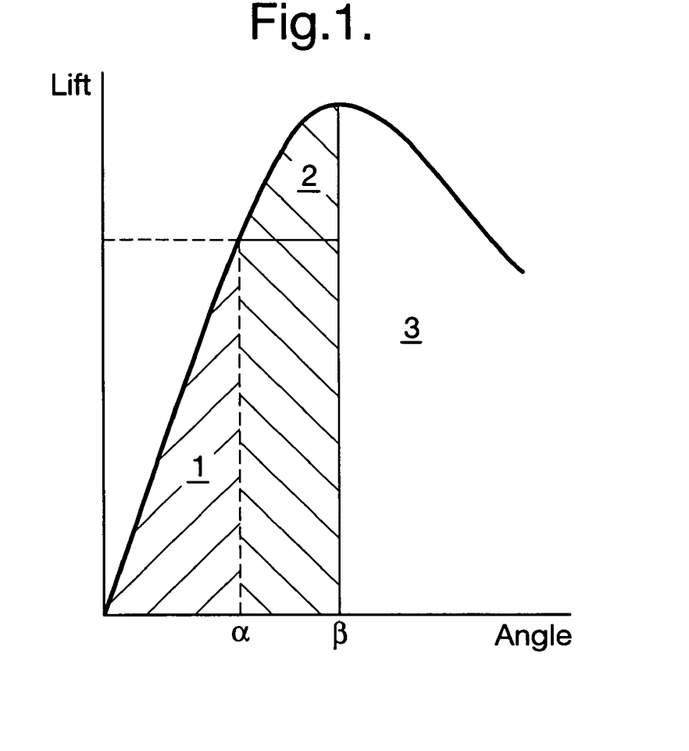
FIG. 1 is a graph of a typical response curve for any lift-generation menber.

FIG. 1 shows graphically a simplistic typical response curve for any lift-generating member and can be described in terms of a stabilising fin. The lift generated by the fin is a function of the angle of that fin, assuming that the fin angle is equivalent to its angle of attack. Angle of attack can be defined as the angle between the fin's chord and the fluid flow. For low angles, up to a value $\beta$, the lift generated increases with increasing angle. Fins are designed to operate in the region of the curve where the angles are up to $\beta$ so that a simple feedback control system, as described in more detail below, is able to adjust the angle it demands to meet the demanded lift according to an approximately linear relationship.

Alternatively an actuator controls the angle of the fin and the position of the actuator may be used to give an indication of the angle of the fin. A simple feedback control system may be employed to vary the angle of the fin to correspond to the required lift. This is compared to the demanded lift and a further control signal sent accordingly. Hence, when the demanded lift is greater than the calculated lift, a control signal is sent to increase the angle of the fin and thereby increase the lift.

One problem with this method is that when the fin is stalling, for angles greater than $\beta$ as shown by region 3 in FIG. 1, increasing the angle of the fin decreases the lift produced. Hence, conventionally the fins are limited to a maximum angle $\alpha$, operating in region 1 of FIG. 1, which avoid stall at all predicted sea conditions as uncontrolled stall can result in substantially increased vibration and ship noise, higher drag and the onset of cavitation on the fin surface.

The angle of the fin may be used to reflect the lift generated by the fin. In practice however, the fin angle is rarely equal to its angle of attack, particularly for extended periods as waves and other effects change the angle between the fin chord and the fluid flow comparatively rapidly, and so the angle of the fin is less representative of the lift generated by the fin than its angle of attack.

Therefore, typically the angle of the fin is limited to 15° either side of a null lift position, usually horizontal. Since the maximum lift is typically generated when the angle of attack is around 21.5°, dependent on fin shape and size, this reduces the available lift for a given fin by as much as 25%. Alternatively, it means that a 25% larger fin is required to meet the desired lift, with consequent weight and storage space penalties, and increased drag effects. This is shown graphically by region 2 of FIG. 1, in which the fin is partially stalling but in which there is lift-generating capacity that is not used with conventional feedback control systems.

A disadvantage of this lift control method is that measuring the lift generated by the fin by positioning measurement means, for example pressure transducers, on the surface of the fin does not provide the true lift of the fin. Pressure measurements provided from the surface of the fin will include fin drag components as well as noise effects such as water current direction and speed, water temperature and ship speed.

A further problem with these measurement means is that the shaft and fin surface are immersed in seawater. Hence components attached thereto must be highly corrosion resistant and bonded very securely. It may be very difficult to find an adhesive that bonds sufficiently securely in seawater and that will last for at least the periods between dry-docking, typically 5 years or more. Furthermore, it is necessary to return the signals from such externally located measurement means into the body of the ship. This causes difficulties in terms of routing cables through the shaft, requiring extensive drilling, or routing them along the exterior of the shaft where they are subject to twisting as the fin angle changes. Sealing problems may also be created at the interface between the immersed seawater environment in which the measurement means operates and the internal, lubricant-filled environment to or through which the signal must be sent.

An alternative method of measuring the deflection of the fin to provide a signal that is proportional to the lift generated by the fin is described in U.S. Pat. No. 2,979,010. This provides a substantially hollow shaft in which is secured a cantilever beam such that it is fixed within the shaft close to the fin and has its free end towards the hull of the ship. When the fin generates lift, the cantilever deflects by an amount that can be measured using a transducer coupled to its free end. This deflection can be processed to provide a signal proportional to the lift generated by the fin. One disadvantage of this method is the need to provide a hollow shaft in which to mount the cantilever beam. Typically shafts comprise very high tensile steel formed as a solid cylinder with a diameter of up to 1 m. Thus it requires a large amount of energy to hollow out the shaft and inhibits the possibility of retrofitting the sensor to existing marine vessels. Furthermore, because the cantilever is mounted internally of the shaft it is very difficult to access the components for routine or emergency maintenance. The sensor is also mounted to a component which moves relative to the ship structure which can increase the risk of damage to the sensor and makes it difficult to get readings back to the control room.

Despite the large forces on the stabilisers the deflection of the shaft and other components in the load path is relatively small which requires a sensitive, and typically fragile, sensor to be used. One benefit of locating the sensor on or in the fin is that a dressed surface can be provided, but this requires careful machining. The majority of the other components within the load path, and particularly once the load path is within the ship structure, are formed of cast steel which is very rough which makes it difficult to attach the required sensor.

The present invention seeks to provide an improved method of measuring the lift generated by a lift-generating member which seeks to address the above-mentioned problems. Accordingly the present invention provides a method of determining the lift generated by a lift-generating member, the lift-generating member having a supporting crux within the lift load path which experiences strain as a result of the lift generated by the lift-generating member; characterised in that the method comprises the steps of:

a) Coupling at least one strain measurement means to the crux;
  b) Obtaining strain measurements from the at least one strain measurement means; and
  c) Calculating the lift generated by the lift-generating member from the at least one strain measurements.

Preferably the lift-generating member is a stabilising fin for a ship. Alternatively the lift-generating member may be a steering rudder for a ship. Preferably the fin is coupled to a shaft. Preferably the fin is rotatable about the axis of the shaft.

Alternatively the lift-generating member may be an aerofoil for an aircraft. Alternatively the lift-generating member may be a rotor blade arrangement for a helicopter.

The crux may be a support component for a steering rudder of a ship. Alternatively the crux may be the fuselage of an aircraft which supports the aerofoil. Alternatively the crux may be a main rotor gearbox of a helicopter supporting the rotor blade arrangement.

Preferably at least one temperature measurement means is coupled to the lift load path component to measure temperature.

Preferably at least one compensated strain measurement is calculated by applying an algorithm to compensate for the or each temperature measurement.

Preferably the or each strain measurement means is fibre optic. Preferably the or each strain measurement means is a Fibre Bragg Grating.

Preferably the or each strain measurement means is alignment sensitive and is aligned with the direction of the strain resulting from lift generated by the lift-generating member. Alternatively two or more strain measurement means may be alignment sensitive and are grouped to resolve all directions of strain resulting from lift generated by the lift-generating member.

Preferably at least two of the strain measurement means are grouped in first and second groups for a given lift-generating movement of the lift-generating member. Preferably the first group measure compression and the second group measure tension.

Preferably the lift generated by the lift-generating member is provided to the control system.

The present invention also provides apparatus for determining lift generated by a lift-generating member, the apparatus comprising: a lift-generating member and a supporting crux within the lift load path which experiences strain as a result of the lift generated by the lift-generating member; and at least one strain measurement device coupled to the crux for measuring the strain experienced as a result of the lift generated by the lift-generating member.

Preferably the lift-generating member is a stabilising fin for a ship. Alternatively the lift-generating member may be a steering rudder for a ship. Alternatively the lift-generating member may be an aerofoil for an aircraft. Alternatively the lift-generating member may be a rotor blade arrangement for a helicopter.

Preferably the fin is coupled to a shaft. Preferably the fin is rotatable about the axis of the shaft.

The crux may be a support component for a steering rudder of a ship. Alternatively the crux may be the fuselage of an aircraft which supports the aerofoil. Alternatively the crux may be a main rotor gearbox of a helicopter supporting the rotor blade arrangement.

Preferably the at least one strain measurement means is coupled to the crux at a position that experiences strain when the lift-generating member is generating lift. Preferably at least one temperature measurement means is coupled to the crux to measure temperature. Preferably at least one compensated strain measurement is calculated by applying an algorithm to compensate for the or each temperature measurement. Preferably the or each strain measurement means is fibre optic. Preferably the or each strain measurement means is a Fibre Bragg Grating.

Preferably the or each strain measurement means is alignment sensitive and is aligned with the direction of the strain resulting from lift generated by the lift-generating member. Alternatively two or more strain measurement means may be alignment sensitive and are grouped to resolve all directions of strain resulting from lift generated by the lift-generating member.

Preferably at least two of the strain measurement means are grouped in first and second groups for a given lift-generating movement of the lift-generating member. Preferably the first group measure compression and the second group measure tension.

Preferably the or each strain measurement means is coupled to an inside surface of the crux There may also be provided a sensor carrier for bridging over an underlying substrate and supporting a sensor, the bridging means comprising a platform for mounting the sensor and legs located at opposing ends of the platform for spacing the platform from the underlying substrate, wherein in use the legs attach the platform to the underlying substrate and characterised in that towers, which extend orthogonally to the plane of the platform, are located at opposing ends of the platform such that bending of the platform when subject to compressive stress is resisted and strain exhibited by the platform portrays strain experienced by the underlying substrate The sensor carrier may have a channel formed in each tower at each opposing end of the platform for securing a conduit.

A cover plate may be mounted to at least one of the towers to close the longitudinal side of at least one channel.

The bridging means may be secured to the underlying substrate by welding, which may experience linear strain with the bridging means being aligned in the direction of strain to portray that strain to the sensor.

The present invention will be more fully described by way of example with reference to the accompanying drawings, in which.

Figure 2:
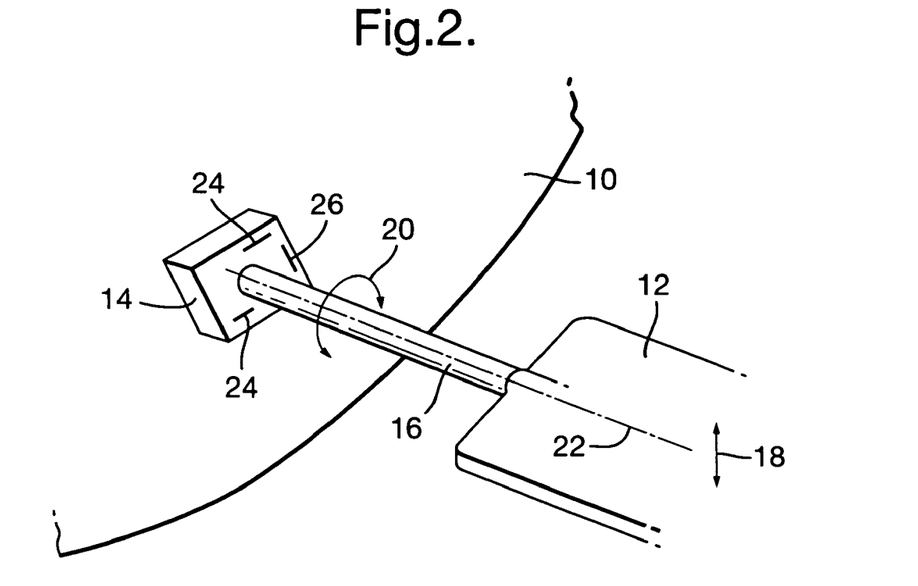
FIG. 2 is a perspective schematic drawing of a stabilising fin generating lift, which is measured according to the present invention.

An exemplary embodiment of the present invention is shown in FIG. 2 in which a stabilising fin 12 is connected into the hull 10 of a ship. Although the fin 12 is shown horizontally, the operational location of the fin 12 at the turn of the bilges on the hull 10 of the ship means there may be a downward tilt of 20°-30° of the fin 12 compared to true horizontal. This increases the moment arm between the ship's roll centre and the lift generated by the fin 12 and is therefore beneficial in correcting ship roll. Smaller fins may be positioned at an even more acute angle to true horizontal, for example up to 45°. The fin 12 generates lift perpendicular to the fin surface in the directions shown by arrows 18. The lift generated by the fin 12 is shown in both perpendicular directions 18, upwards and downwards as drawn, since this is useful lift in stabilising the ship. Generally, the fin may be angled about its longitudinal axis 22 by an equal amount in either direction from the null (usually horizontal) position to generate lift in the upward or downward direction. For other applications the lift is generated in different directions.

The fin 12 is coupled to a shaft 16 and is rotatable about its longitudinal axis 22 with or about the shaft 16, as shown by arrows 20. Typically a large fin 12 is around 8 m long in the direction of the longitudinal axis 22 and around 3 m wide in a direction mutually perpendicular to the longitudinal axis 22 and the direction of lift 18. The shaft 16 typically comprises a solid high tensile steel bar having cylindrical cross-section with a diameter of around 0.75 m. Smaller fins 12 may be around 1.5 m long and proportionally narrower, coupled to a correspondingly smaller diameter shaft 16.

Figure 3:
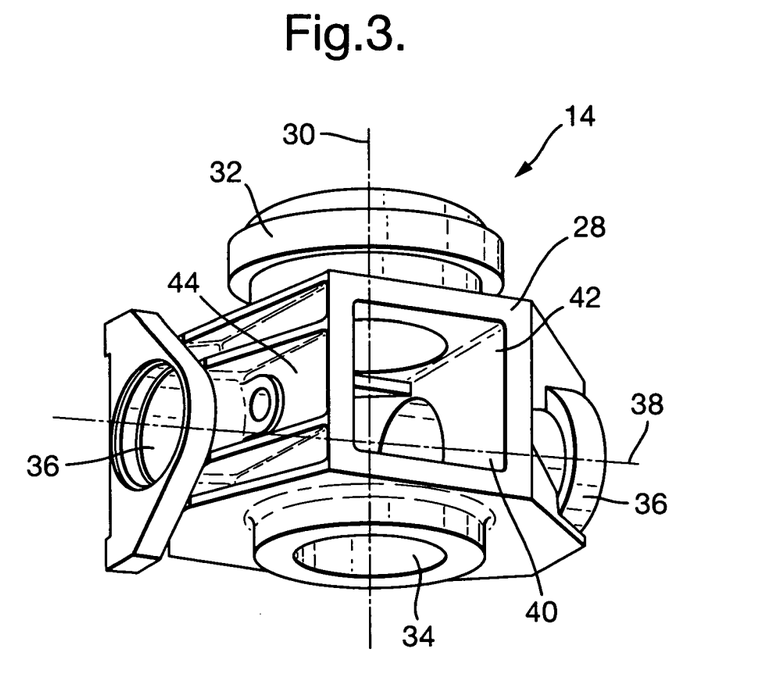
FIG. 3 is a perspective schematic enlargement of a crux for the stabilising fin of FIG. 2.

The shaft 16 is coupled, at the opposite end to the fin 12, to a crux 14 located within the hull 10 of the ship The primary function of the crux is to support the fin (and its shaft). An enlargement of the crux 14 is shown in FIG. 3. This depicts a cast steel component based on a hollow cube or cuboid shape 28 with a typical volume of 1 m$^3$. Although the crux 14 is shown as a cube or cuboid shape in this embodiment, other shapes may be selected during the design stage. The crux 14 may provide for rotation of the fin 12 about two mutually perpendicular axes. Firstly, the crux 14 may rotate about an approximately vertical axis 30. This enables the fin 12 to be moved from a stowed position within the hull 10 that is roughly parallel with the length of the ship to a deployed position as seen in FIG. 2. To effect this rotation about the vertical axis 30 a non-rotating pintle 32 in the top surface and a similar pintle 34 in the opposing bottom surface surround bearings that allow the crux 14 to rotate with respect to the pintles 32 and 34. The pintles 32, 34 and corresponding bearing housings are preferably tubular protrusions of 0.5 m to 1 m diameter and 0.5 m length. However, these dimensions can be varied depending on the particular application and hence the loads experienced and the mass to be moved. The crux 14 may also comprise locking means (not shown) to maintain the fin 12 in the deployed position until commanded to the stowed position.

The fin shaft 16 is coupled to the crux 14 via cylindrical apertures 36 in opposed side surfaces of the cube 28. The apertures preferably comprise tubular protrusions of 0.5 m to 1 m diameter and 0.5 m length. The exact dimensions are dependent on the shaft 16 used. The horizontal axis 38 that extends through these apertures 36 is perpendicular to the vertical axis 30 and, in use, moves through 90° dependent on whether the fin 12 is in the stowed or deployed position. When the fin 12 is in the deployed position the axis 38 is identical to the longitudinal axis 22 shown in FIG. 2. The crux 14 includes means to rotate the shaft 16 within apertures 36 about the axis 38 to cause the angle of attack of the fin 12 to change. Typically this rotation will be around ±22° from the null lift (usually horizontal) position. However, the degree of rotation will be set as appropriate to the particular application. Another of the side faces comprises an access aperture 40 through which the interior of the cube 28 may be accessed for maintenance. A door (not shown) is bolted over the access aperture 40 to seal the crux 14 for operational readiness.

Figure 6:
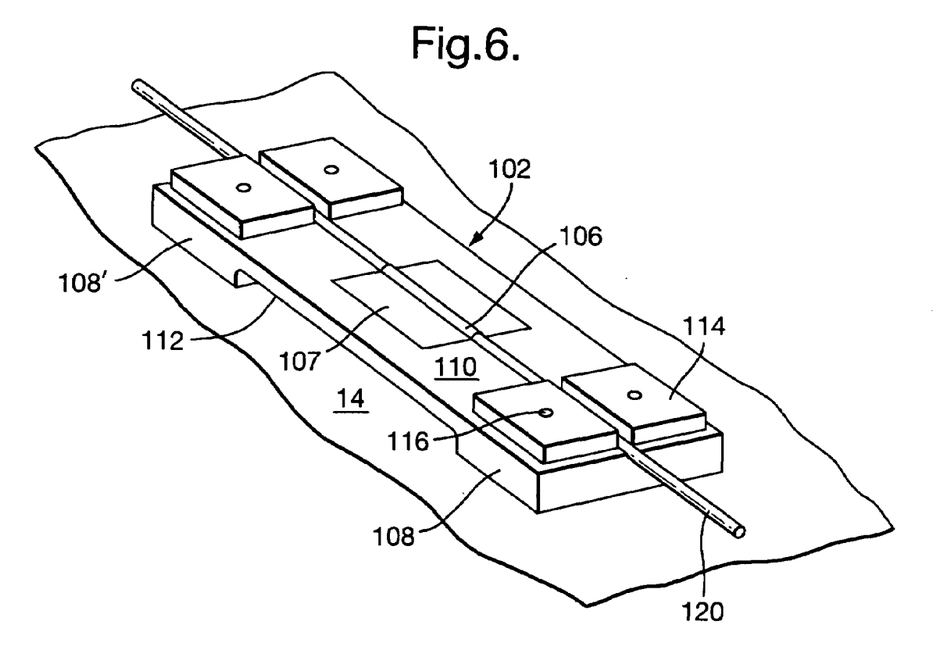
FIG. 6 depicts a sensor carrier for a sensor mounted to a crux.

The surfaces of the crux 14, interior 42 and exterior 44, are typically not machined post-casting although some or all of the surfaces 42 and 44 may be machined or ground to improve the surface finish. For example, where it is desired to attach strain gauges 24 or other components to the crux 14 it may be necessary to machine or grind at least one of the surfaces 42 and 44 to a surface finish no worse than 6.3 µm. Alternatively the strain gauges 24 may be attached to a sensor carrier with an appropriate surface finish. A particularly preferred sensor carrier is depicted in FIG. 6.

At least one strain gauge 24 is located on one or more surfaces of the crux 14. FIG. 2 shows two strain gauges 24 located on the exterior of the crux 14 at positions experiencing relatively large strain when the fin 12 is generating lift. However, one or more strain gauges 24 may be used and these may preferably be located on one or more interior surfaces of the crux 14. Indeed, in a preferred embodiment the gauge or gauges 24 are located on an interior surface of the crux 14 to provide additional protection from the harsh operating surroundings and a known operating environment. The gauges 24 are preferably located on the interior surface of the crux 14 through which the shaft 16 extends and that is furthest outboard when the fin 12 is in its deployed position. It has been found that, although the fin 12 generates lift perpendicularly to its surface, the strain is not aligned in this direction. Instead it is aligned to the plane of the fin 12 when it is in its null lift position, approximately perpendicularly to the expected orientation.

Although the strain measured by the strain gauges 24 is large relative to the strain experienced when the fin 12 is not generating lift, the maximum measured strain is typically in the order of 100-150 µstrain. This maximum strain varies with the amount of lift generated by the fin. Thus a sensitive type of strain gauge 24 is required to measure the strain. The preferred type of strain gauge 24 for this application is a Fibre Bragg Grating (FBG).

Fibre Bragg Gratings are fibre optic gauges. Each grating comprises a section of alternating bands of high and low refractive index that reflects a narrow band of the optical waves. The reflected wavelength varies independently with strain and temperature and so analysis of the reflections, preferably in real time, provides a temperature-dependent strain measurement. By incorporating a strain-isolated FBG a strain measurement caused by the temperature can be obtained and used to compensate the strain measurement or measurements for the temperature component. Although a single FBG can be used to obtain measurements it is simple, and often preferable, to multiplex several gratings in a single optical fibre so that measurements can be taken for a number of wavelengths.

Temperature sensors 26, for example strain-isolated FBGs as described above, are located on the crux 14 preferably at positions experiencing very little or no strain, particularly during fin lifting. FIG. 2 shows a single temperature sensor 26 to provide a measurement to enable compensation of the strain measurements provided by the FBGs 24. However, more than one temperature sensor 26 may be provided to offer redundancy in case of failure and the ability to average measurements to improve their accuracy. Preferably the temperature sensor 26 is located at a position that experiences little or no strain so that the sensor is not damaged and measurements are not distorted by varying strain. However, if a suitable sensor 26 or sensor carrier is used, it may be located at a position that experiences strain at some or all of the time.

One preferred sensor carrier is shown in FIG. 6 which depicts a sensor carrier 102 of the invention mounted onto the crux 104. The sensor carrier supports a sensor 106, which in this embodiment is a fibre Bragg grating.

The underlying substrate 104 has a roughness of a magnitude that makes it difficult to attach the sensor directly thereto. As mentioned earlier, this may be a rough cast components with no post-processing machining.

The carrier or bridging means 102 has a leg 108, 108' at either end and a platform 110 that extends between the two legs. The legs 108, 108' are mounted to the underlying substrate 104 by a weld join, though it will be appreciated that any appropriate join e.g. dowel joint is applicable. The weld join extends around the outer facing sides of the leg and fixes each leg securely to the substrate.

It may be necessary to grind the surface of the underlying substrate to prepare a welding surface. The ground surface is more uniform than the untreated surface, but is still too rough for direct attachment of the sensor. A hand tool is usually sufficient to achieve the desired surface.

The legs, which are preferably integral with the platform, have a height that is greater than the maximum roughness so as to raise the platform 110 above the substrate 104. The platform is therefore isolated from the substrate by a gap 112 preferably left open to the atmosphere or, where the platform is submerged in a fluid, to the fluid in which it is submerged.

The upper surface of the platform 110 is planar with a roughness below that necessary to securely attach the sensor and the sensor is bonded thereto either by adhesive or preferably spot welding.

Since the legs are firmly attached to the underlying substrate as the underlying substrate experiences stress or strain the stress and strain is transferred to the platform. The platform then portrays the strain experienced by the underlying substrate. It is preferred that the strain transfer provides a linear strain profile across the length of the platform, or at least the length of the platform to which the sensor is bonded. This is why a bridging carrier with legs integral with the platform is preferred over a platform attached to the legs by dowels as the strain profile created by the dowels is less linear. A linear strain field through the platform provides a more true representation, or echo of the strain field within the underlying substrate.

The platform must be of a thickness that resists significant deformation or buckling when subject to the strain experienced by the underlying substrate. Such deformation can affect the reading given by the sensor as it affects the strain field through the platform. Ridges or corrugations can be provided on the underside of the platform i.e. the side opposite to that on which the sensor is mounted to provide further stiffness to the platform and to further resist buckling.

It has been found that buckling of the platform can be reduced through the provision of towers 114 provided at either end of the sensor carrier. Each of the towers preferably has a longitudinal channel arranged in line with each other and through which tubing passes and which carries the fibre optic cable of the fibre Bragg grating (FBG). Beneficially, the towers are essentially mechanical means and do not rely on the provision of elastomeric or other deformable material that may degrade under chemical attack. The towers may be easily formed in the machining step which forms the carrier thereby reducing the number of manufacturing steps over the prior art carriers.

The fibre Bragg grating consists of tubes 120, foil 107 and a fibre optic cable. The tubes are bonded to the foil. The carrier can experience significant temperature increases induced by the welding and this can damage the sensor. Consequently the carrier is first mounted to the underlying substrate with the grating attached thereafter.

The FBG is adhesively bonded to the foil and the foil 107 spot welded to the platform using rows of spot welds. The tubes 120 extend through the channels in the towers which provide an increased robustness. The sensor array is leak tested.

A cover plate (not shown) is bolted to the towers 114 by bolts (not shown) which engage with threaded apertures 116. The cover plate assists in securing the tubing to the sensor carrier.

The sensor carrier is thermally matched to the underlying substrate to minimise strain caused by differences in thermal expansion coefficients of the substrate and the carrier. Indeed, it is possible to compensate for strain induced by thermal expansion using a strain gauge on a carrier described with reference to FIG. 7.

Figure 7:
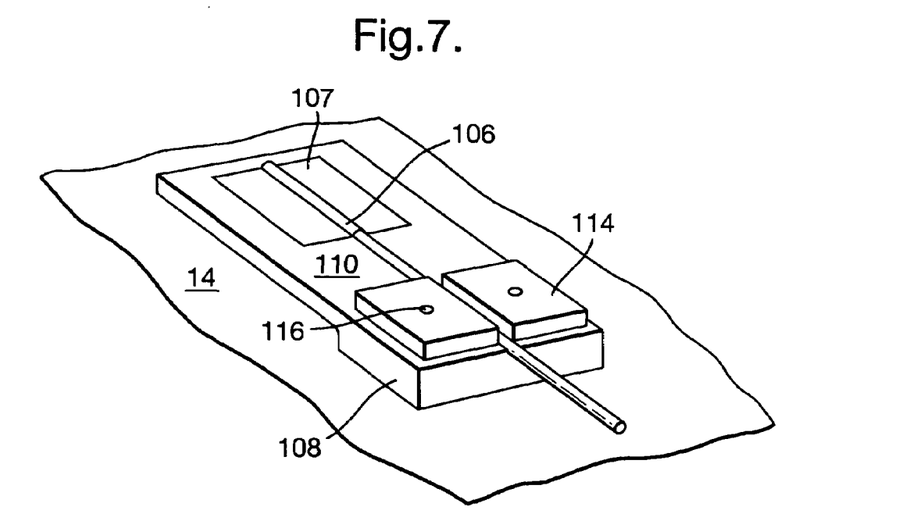
FIG. 7 depicts a temperature compensation carrier mounted to a crux

In FIG. 7 the sensor carrier has a similar form as that described with respect to FIG. 6 with the notable exception that the platform 110 is cantilevered. The leg 108 is attached to the underlying substrate by a weld joint as before. The carrier therefore experiences the same thermal effects as the substrate. Since the platform is not secured at the end opposite the leg any strain measured by the sensor 106 is not due to strain from the underlying substrate, but is rather due to secondary strains, the greatest of which is thermal expansion of the platform.

By measuring the strain of the platform that echoes that of the substrate and subtracting the strain caused by temperature it is possible to provide a value for strain compensated for temperature.

Residual strains giving inaccurate readings can be generated during the bonding of the sensor to the carrier or the carrier to the underlying substrate. Such strains can be removed by pressure or temperature cycling the sensor and substrate.

It will be appreciated that the carrier described above offers a number of significant advantages. For example, strain sensors can be located in areas of increased roughness avoiding the need for substrates to undergo extensive machining or treatment to make them suitable for sensor attachment.

The carrier allows sensors to be retrofitted in areas which may be inaccessible for machining apparatus that is required to bring the surface finish down to below a roughness of 6.3 μm.

The sensor carrier, formed from stainless steel, is mounted to an internal surface of the crux in a position that experiences a strain detectable by the preferred fibre Bragg grating sensor. The internal surface of the crux is filled with a lubricant at 1.5 Bar and the strain gauge is mounted within the lubricant, which is preferably an oil.

The carrier is rectangular and has a platform length of around 95 mm a platform width of 25 mm and a depth of 2.5 mm. Legs are located at each end of the platform to secure the platform to the crux. Each leg has a height of around 2.5 mm to raise the platform above the mean surface of the crux. The legs extend the width of the platform and have a length of around 20 mm each. Towers with a height of 2.5 mm are mounted to the upper surface of the platform above the legs and improve the transfer of strain experienced by the underlying substrate to the platform.

The underside of the platform is preferably planar, but may be ridged or corrugated to increase the stiffness of the platform and improve the accuracy of strain transfer.

The carrier is mounted to the rough surface of the crux by welding. A welding torch is smaller than the machining equipment required to machine the crux to provide a surface suitable for direct mounting of the sensor. It will be appreciated that the above carrier enables easier mounting of a sensor to what may be an otherwise inaccessible location. Additionally, it is possible to retrofit sensors to crux equipment that is already in service.

In alternative embodiments the legs form part of the underlying substrate with a platform mounted to the top thereof.

Beneficially, in this embodiment it is possible to cast or form the legs at the same time as the underlying substrate. The benefit is that the platform can be secured to the legs by a dowel arrangement and can therefore be removed and replaced should the sensor carried by the platform be damaged for any reason. One problem with this arrangement is that the dowel connection reduce the transfer of strain to the platform so that the gauges must have to sense smaller values of strain. Additionally the strain profile exhibited by the platform is less linear In a further alternative arrangement the linear fibre Bragg grating is replaced with a rosette arrangement which is unidirectional with regard to the strain measured.

Multiple bridging means and sensors may be provided on a single substrate to give more accurate results. Where it is necessary to locate two or more sensors onto the underlying substrate it is possible to use a frame. The frame releasably supports the carriers at a known orientation and position relative to a datum. Beneficially, where the carrier uses a cover plate, the screw holes 16 that are used to secure the cover to the towers 14 may be used to releasably secure the carrier to the frame.

The frame is located on the underlying substrate using the datum to identify its relative position. Each of the carriers can be secured directly to the underlying substrate either permanently or temporarily whilst still attached to the frame. If the attachment is temporary it is then possible to remove the frame, leaving the carrier attached to the underlying substrate, enabling a permanent attachment to be made.

Once a permanent attachment is made it is possible to apply the FBG sensor to the carrier as described above.

As described above, it is beneficial to position strain gauges or sensors 24 at locations on the crux 14 where comparatively large strains are measured when the fin 12 is generating lift. It is also crucial to align the strain gauges 24 with the strain that is caused by the lift generated by the fin 12 rather than strain caused by other factors. Finite Element Analysis (FEA), hand calculation, scale model analysis or any other suitable means known to one skilled in the art may be used to find these positions and alignments. As has been described above, the strain resulting from the lift generated by the fin 12 was found to be orientated approximately perpendicularly to the direction of that lift 18. Hence an accurate strain model is required. For example, the fin 12 may be subjected to a known lift and a strain map of the crux 14 constructed using FEA and used to identify at least one position and orientation experiencing relatively large strain for this lift condition. Further analysis can be done with the fin 12 subjected to different magnitudes and directions of lift to ensure that the at least one position identified experiences large enough strains to be measured for most lift conditions. Ideally at least two positions are identified such that for a given lift condition one position experiences a relatively large compressive strain and one position experiences a relatively large tensile strain.

A benefit of having two sensors or groups of sensors located in these compressive and tensile positions is that by averaging the strains measured, noise effects such as current magnitude and direction can be at least partially cancelled out of the signals. This enables the strain measurements to better reflect the true lift of the fin rather than a composite lift comprising fin lift, drag, water current speed and direction, ship speed and other noise effects. Hence, at least some of the region labelled 2 in FIG. 1 can be utilised by employing the measurement method of the present invention.

A further benefit of providing two sensors or groups of sensors experiencing different strains for a given conditions is that there is an amount of redundancy provided in the system. This is beneficial in case of sensor failure during operation since there is no need to effect repairs before the ship is scheduled for maintenance in dry-dock. This prevents the additional costs incurred by unscheduled dry-docking.

Temperature measurement sensors or gauges 26 are provided to enable the strain measurements to be compensated for differences in the system temperature between initial calibration and an operative state. For example, the fin 12 and crux 14 is submerged in relatively cold seawater during operation, often for extended periods of time. Hence, the overall temperature of the fin 12 and shaft 16 may be lower than when the strain gauges 24 were fitted and calibrated, for example in dry-dock. By providing temperature sensors 26 the control system can receive compensated strain measurements that more accurately reflect the true lift of the fin 12. Hence the fin 12 can be operated in region 2 of FIG. 1 with a greater degree of confidence. Only one temperature sensor 26 is required although it may be preferable to provide two or more sensors 26 to enable an average temperature to be provided and to offer a measure of redundancy in the system as previously discussed with respect to the strain gauges 24.

Figure 4:
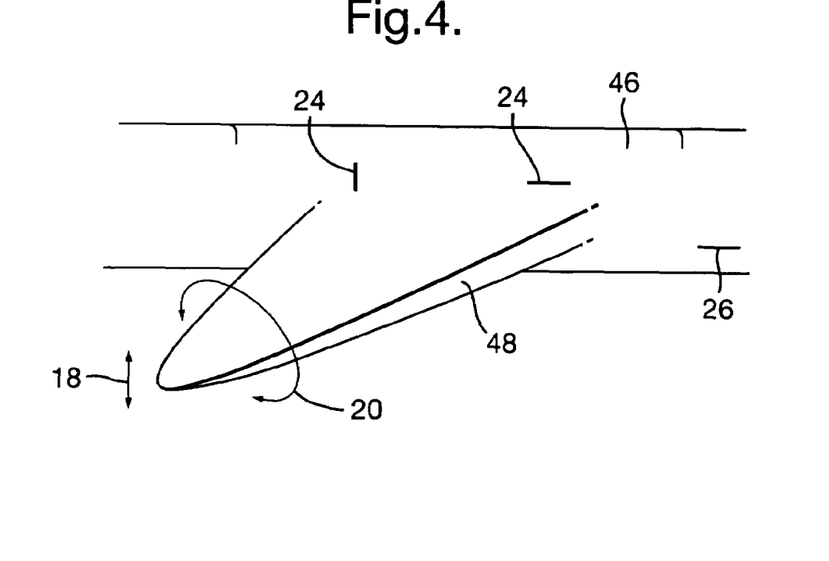
FIG. 4 is a perspective schematic drawing of an aerofoil generating lift, which is measured according to the present invention.

FIG. 4 shows an alternative embodiment of a lift-generating member employing the method of the present invention in which the lift-generating member is a wing 48 attached to an aircraft 46, of which only a part is shown. As before the wing 48 generates lift approximately perpendicular to the surface of the wing 48, shown by arrows 18, and may be subject to torsional forces, caused by crosswinds for example, as shown by arrows 20. Strain gauges or sensors 24 are again located away from the wing 48, on internal or external surfaces of the aircraft that support the lift generating member and which are subject to relatively large strains as previously described with respect to the first embodiment. At least one temperature gauge or sensor 26 is provided on the fuselage away from the wing 48, in a position experiencing little or no strain, to provide a system temperature as described above.

Figure 5:
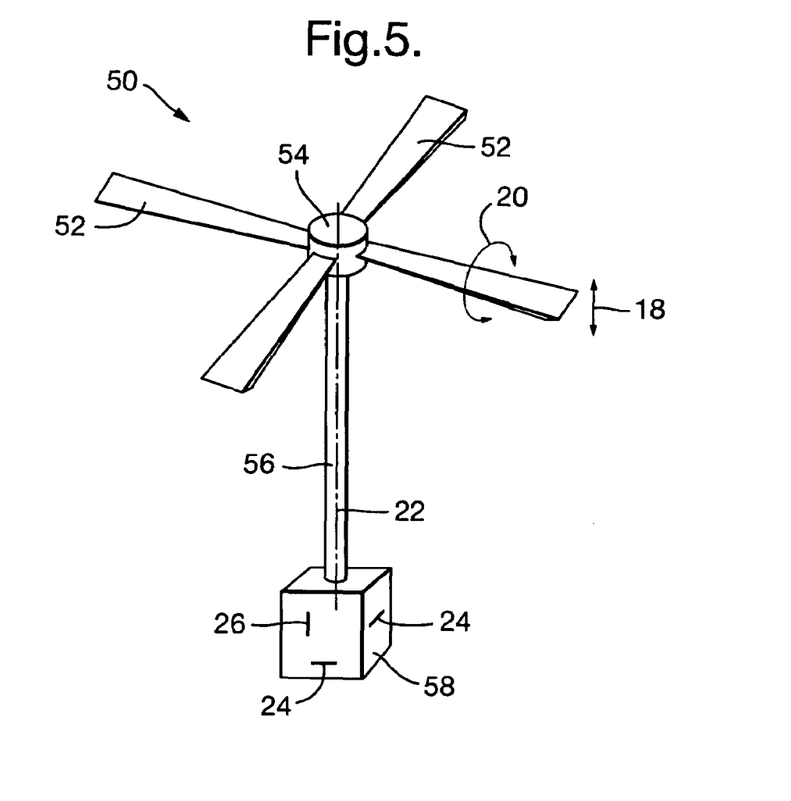
FIG. 5 is a perspective schematic drawing of a rotor arrangement for a helicopter, the rotor arrangement generating lift, which is measured according to the present invention.

A third embodiment of a lift-generating member employing the present invention is shown in FIG. 5 in which the lift-generating member is a rotor blade arrangement 50 for a helicopter. Four rotor blades 52 are connected in fixed relative alignment about a cylindrical hub 54 and are substantially identical to one another. Four rotor blades 52 are shown by way of example; other numbers of rotor blades 52 are also possible. Each rotor blade 52 generates lift in approximately the directions shown by arrows 18. The angle of each rotor blade 52 can be varied as shown by arrows 20 subject to demand signals from a control system. The hub 54 is coupled to a rotating shaft 56 and rotates in synchronicity with it about its longitudinal axis 22. The shaft 56 is coupled to a non-rotating crux 58, usually known as a main rotor gearbox, that is bolted to the body of the helicopter (not shown) to transfer the lift generated.

The gearbox 58 performs a similar purpose to the crux 14 of the first embodiment. Hence two strain gauges or sensors 24 are provided at locations on the gearbox 58 that experience relatively large strains when the rotor blade arrangement 50 is generating lift. At least one temperature gauge 26 is provided at a location on the gearbox 58 that experiences little or no strain to provide an overall system temperature. One temperature gauge 26 is sufficient for the rotor arrangement 50 although two or more may be preferable to provide redundancy and averaging capabilities.

The embodiments described hereinbefore demonstrate the benefits of a method of measuring the true lift of a lift-generating member by positioning strain measurement gauges away from the member itself. The provision of temperature measurement means gives a mechanism to compensate the system for changes from initialisation temperature conditions which could otherwise adversely affect the conversion of strain measurements into the lift of the member.

Although embodiments of the present invention have been described with two strain gauges, any number of gauges can be used. For example a single gauge can be used or more than two gauges can be used to provide the aforementioned benefits in terms of averaging results and redundancy. Any suitable strain gauges may be used to derive the benefits of the present invention. Alternatively any other strain measurement means may be used. However, it should be noted that the maximum strains experienced are typically small and so a sensitive gauge is required with high resolution, typically less than 0.5 µstrain. Given the harsh surroundings in which the gauges are required to operate it is also important to provide a rugged gauge with some measure of protection. As mentioned above, one preferred type of strain gauge is a fibre optic sensor such as a Fibre Bragg Grating (described above). However, any suitable alternative may be used without prejudice.

With a linear strain gauge such as the FBG it is important to ensure that the gauge is correctly aligned with the strain to be resolved. If it is uncertain in which direction a strain is aligned, or the direction alters for different lift conditions, it may be preferable to utilise a non-linear strain gauge or to create a rosette of linear gauges. It may be desirable to run a computer simulation of the lift conditions following positioning of the gauge or gauges to check that it or they have been correctly aligned. This may take the form of re-running the FEA or other method used to determine suitable positions for the gauges. Alternatively another method of checking the positioning may be used as known in the art.

Similarly, although embodiments of the present invention have been described with one temperature sensor, any number of sensors may be provided. It may be preferable to provide two or more sensors to give the redundancy and averaging benefits previously discussed. Although temperature sensors have been described, any other temperature measurement means may be used. Further, any suitable temperature sensor or gauge may be used to obtain the benefits of the present invention. There is no requirement to especially align the temperature gauge. In a preferred embodiment the temperature sensor is positioned to ensure it experiences little or no strain and is firmly attached. However, providing a suitable sensor and/or sensor carrier is used, it may be located in a position that experiences strain. Alternatively, a strain gauge that has its own temperature compensation means may be used and no additional temperature sensor provided, or only a redundant sensor provided in case of failure.

The present invention is also applicable to rudders, which are similar to stabilising fins but rotated so as to be orientated substantially vertically downwards from the hull of the ship. Its purpose is to steer the ship by developing lift in a transverse direction, approximately perpendicular to the length of the ship. Hence the lift generated by different lift-generating members is in different directions and the term lift is used to cover any of these embodiments.

Although the method of the present invention has been described with reference to a stabilising fin for a ship, an aircraft wing and a rotor blade arrangement for a helicopter it can be equally applied to any system in which it is desired to measure the true lift of a lift-generating member, particularly when that member is subject to additional torsional forces and noise effects and it is difficult or unsatisfactory to measure the lift directly on the member. For example, it could be applied to a rudder for steering a ship or the wind turbine industry.

We claim:

1. A method of determining the lift generated by a lift-generating member, the lift-generating member coupled to a shaft and the shaft coupled to a supporting crux within a lift load path, the crux experiencing strain as a result of the lift generated by the lift-generating member; the method comprising:
    a) coupling at least one strain measurement means to the crux;
    b) obtaining strain measurements from the at least one strain measurement means; and
    c) calculating the lift generated by the lift-generating member from the at least one strain measurements.

2. The method of claim 1, wherein the lift-generating member is a hydrofoil for a waterborne vessel.

3. The method of claim 1 wherein the lift-generating member is a rotor blade arrangement for a helicopter.

4. The method of claim 1, wherein the or each strain measurement means is a Fibre Bragg Grating.

5. The method of claim 1, further comprising the step of subjecting the crux to finite element analysis to determine the direction of the strain resulting from lift generated by the lift-generating member.

6. The method of claim 1, wherein the or each strain measurement means is alignment sensitive and is aligned with the direction of the strain resulting from lift generated by the lift-generating member.

7. The method of claim 1, wherein two or more strain measurement means are alignment sensitive and are grouped to resolve all directions of strain resulting from lift generated by the lift-generating member.

8. An apparatus for determining lift generated by a lift-generating member, the apparatus comprising:
    the lift-generating member coupled to a shaft and the shaft coupled to a supporting crux within a lift load path, the crux experiencing strain as a result of the lift generated by the lift-generating member; and
    at least one strain measurement device coupled to the crux for measuring the strain experienced as a result of the lift generated by the lift-generating member.

9. The apparatus of claim 8, wherein the lift-generating member is a hydrofoil for a waterborne vessel.

10. The apparatus of claim 8 wherein the lift-generating member comprises an aerofoil for an aircraft.

11. The apparatus of claim 8, wherein the or each strain measurement means is fibre optic.

12. The apparatus of claim 11 wherein the or each strain measurement means is a Fibre Bragg Grating.

13. The apparatus of claim 8, wherein the or each strain measurement means is alignment sensitive and is aligned with the direction of the strain resulting from lift generated by the lift-generating member.

14. The apparatus of claim 8, wherein two or more strain measurement means are alignment sensitive and are grouped to resolve all directions of strain resulting from lift generated by the lift-generating member.

15. The apparatus of claim 14 wherein at least two of the strain measurement means are grouped in first and second groups for a given lift-generating movement of the lift-generating member.

16. An apparatus for determining lift generated by a lift-generating member, the apparatus comprising:
    the lift-generating member and a supporting crux within a lift load path which experiences strain as a result of the lift generated by the lift-generating member; and at least one strain measurement device coupled to the crux for measuring the strain experienced as a result of the lift generated by the lift-generating member, wherein the strain measurement device is mounted to the crux through a sensor carrier which bridges over the crux and supports the strain measurement device, the bridging means comprising a platform for mounting the strain measurement device and legs located at opposing ends of the platform for spacing the platform from the crux, wherein in use the legs attach the platform to the crux, and towers, which extend orthogonally to the plane of the platform, are located at opposing ends of the platform such that bending of the platform when subject to compressive stress is resisted and strain exhibited by the platform portrays strain experienced by the underlying substrate.

17. The apparatus of claim 16, wherein a channel is formed in each tower at each opposing end of the platform for securing a conduit.

18. The apparatus of claim 17, wherein a cover plate is mounted to at least one of the towers to close the longitudinal side of at least one channel.

19. The apparatus of claim 16, wherein the platform has a surface roughness of below 6.3 μm.

* * * * *